May 12, 1925.
B. S. WEINFIELD
1,537,719
AUTOMATIC SWITCHING EQUIPMENT
Filed May 12, 1922
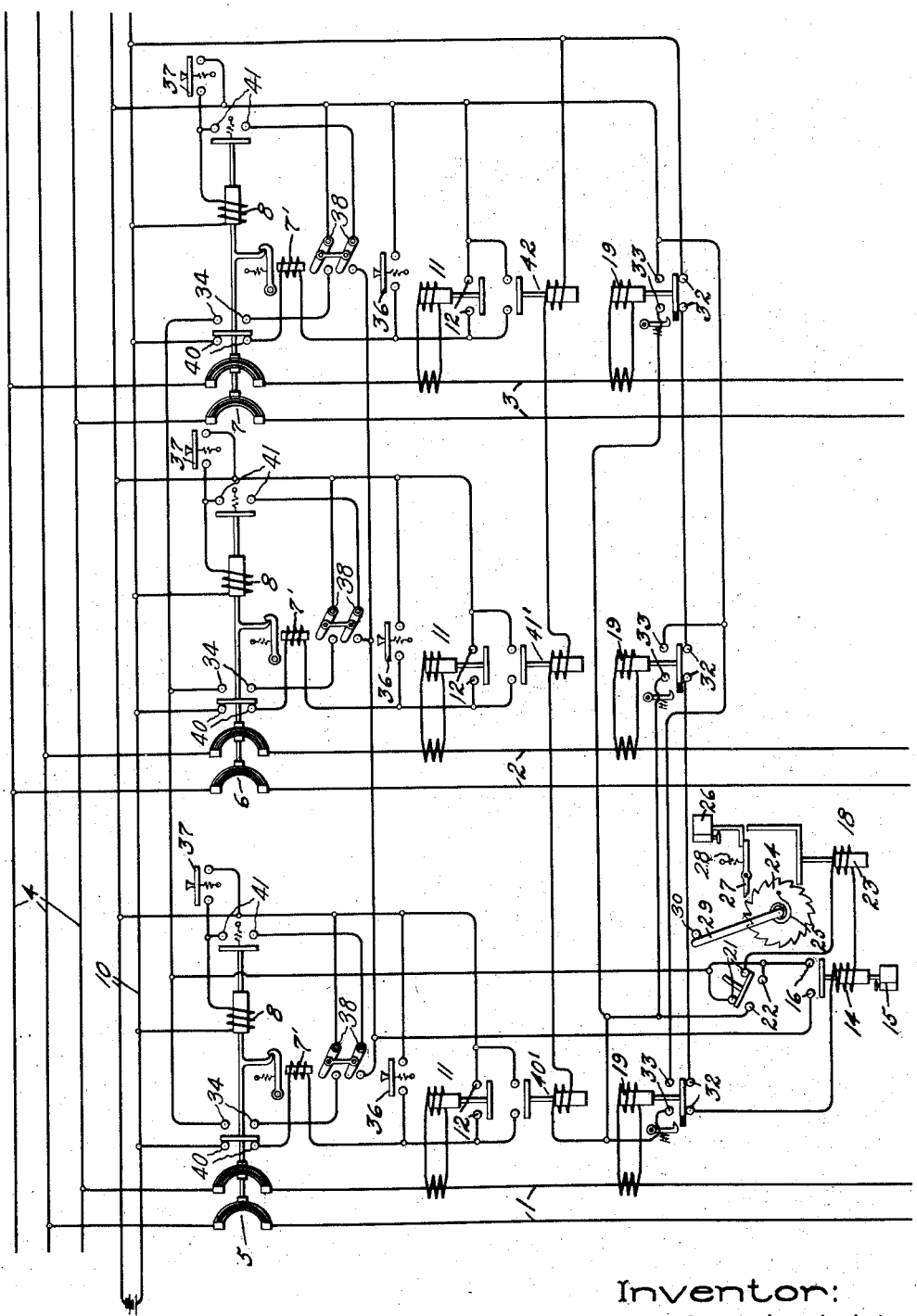
Inventor:
Benjamin S. Weinfield,
by Allen G. Davis
His Attorney.

Patented May 12, 1925.

1,537,719

UNITED STATES PATENT OFFICE.

BENJAMIN S. WEINFIELD, OF SCHENECTADY, NEW YORK, ASSIGNOR TO GENERAL ELECTRIC COMPANY, A CORPORATION OF NEW YORK.

AUTOMATIC SWITCHING EQUIPMENT.

Application filed May 12, 1922. Serial No. 560,517.

*To all whom it may concern:*

Be it known that I, BENJAMIN S. WEINFIELD, a citizen of the United States, residing at Schenectady, county of Schenectady, State of New York, have invented certain new and useful Improvements in Automatic Switching Equipments, of which the following is a specification.

My invention relates to automatic switching equipments and particularly to such equipments which are arranged to control the connections between a plurality of load circuits and a common source.

My invention is especially adapted for use in controlling the connections between a source of polyphase current and a plurality of single phase load circuits each one of which is arranged to be connected to a different phase of said source so that when the source of polyphase current is supplying current to all of the single phase load circuits the phases of polyphase source are substantially balanced. In such a system it is usually the practice to provide a circuit breaker between each single phase load circuit and the phase of polyphase source to which it is connected and to provide means for opening a circuit breaker whenever an overload occurs on the single phase load circuit in which it is connected. When a single phase load circuit is disconnected from the polyphase source, the phases of this source become badly unbalanced if the other single phase load circuits remain connected thereto. Therefore, it is desirable to have an arrangement for disconnecting all of the other single phase load circuits from the common source of polyphase current in case the overload on one of the single phase load circuits is of a permanent character or exceeds a predetermined value, and for automatically reclosing any one of the single phase load circuits in case the overload remains connected to the load circuit for only a very short time and is not of such a severe character as to exceed the interrupting capacity of the circuit breaker.

One object of my invention is to provide an automatic switching equipment for a plurality of load circuits supplied from a common source, which is arranged to open and reclose automatically the circuit breaker in a load circuit a predetermined number of times upon the occurrence of an overload on said load circuit and to open all of the circuit breakers in all of the other load circuits connected to the common source and to prevent the reclosing of any of the circuit breakers after any one of the circuit breakers has been opened a predetermined number of times.

Another object of my invention is to provide an automatic switching equipment of the character above referred to, which is arranged to open and reclose automatically the circuit breaker in any load circuit a predetermined number of times upon the occurrence of an overload on the load circuit if said overload does not exceed a predetermined value and for opening said circuit breaker and preventing the automatic reclosing of the circuit breaker if the overload exceeds said predetermined value.

Another object of my invention is to provide an automatic switching equipment of the character above referred to, which is arranged to open the circuit breakers in all of the load circuits and to prevent any of these breakers from being automatically reclosed in case the overload on any load circuit exceeds a predetermined value.

My invention will be better understood from the following description taken in connection with the accompanying drawing, and its scope will be pointed out in the appended claims.

The single figure of the accompanying drawing is a diagrammatic view of the apparatus and circuit connections used in one embodiment of my invention.

Referring to the drawing, 1, 2 and 3 represent three single phase load circuits which are arranged to be connected by means of the circuit breakers 5, 6 and 7, respectively to different phases of a source of polyphase current represented by the mains 4. These circuit breakers may be of any suitable type. The particular type shown in the drawing is well known in the art as a latched-in breaker. Each breaker is provided with a trip coil 7', which, when energized, trips a latch that holds the breaker in its closed position, and a closing coil 8, which, when energized, closes the circuit breaker.

The trip coil 7' of each circuit breaker is arranged to be connected to a source of current, such as a control circuit 10, by means of an overload relay 11 upon the occurrence of an overload on the load circuit in which the circuit breaker is connected. These overload relays are arranged to close their contacts 12 only when the load current in the corresponding load circuit exceeds a predetermined value. The circuit of the closing coil 8 of each circuit breaker is arranged to be connected to the control circuit 10, when the corresponding circuit breaker is opened, by means of a slow-acting reclosing relay 14, which is common to the circuit breakers, and which is arranged to be operated when any one of the circuit breakers opens.

The reclosing relay 14 is provided with any suitable means, such as a dash-pot 15, so that it does not close its contacts 16 until a predetermined time after the circuit of the operating coil of the relay is completed. The dash-pot 15 is preferably arranged so that it does not delay the opening of the contacts 16 when the coil is deenergized. The circuit of the reclosing relay 14 is controlled by a notching relay 18 and the lock-out relays 19, one of which is provided for each load circuit. The circuit of the notching relay 18 is connected in any suitable manner so that it is energized each time the relay 14 is energized. As shown in the drawing, the coil of the notching relay 18 is connected in series with the coil of the reclosing relay 14. Relay 18, however, is so designed that it does not open its contacts 21 and close its contacts 22 until the coil of the relay has been energized a predetermined number of times. This relay 18 is preferably designed so that the coil has to be energized successively a predetermined number of times with less than a certain time between each successive energization in order to open the contacts 21 and close the contacts 22. If the coil is not reenergized within a certain time after becoming deenergized, the relay is automatically reset to its normal position. As shown in the drawing the plunger 23 of the notching relay is arranged to actuate a ratchet 24, against the action of a spring 25, and a time delay device 26, such as a dash-pot or a bellows. The relay is also provided with a holding pawl 27 which is normally held out of engagement with the ratchet 24 by the weight of the movable element of the time delay device 26 so that the ratchet can be rotated by the spring 25 and which is arranged to be moved into engagement with the ratchet 24 by means of a spring 28 when the time delay device 26 is actuated by the plunger 23. The time delay device 26 is designed so that only the downward movement thereof is delayed. An arm 29 is attached to the ratchet 24 and is normally held in engagement with a stop 30 by means of the spring 25. When the coil of the relay 18 is energized successively a predetermined number of times with less than a predetermined time between each successive energization, the arm 29 opens the contacts 21 and closes the contacts 22. In the particular embodiment shown, the relay 18 is arranged to open and close its contacts if the coil has been energized three times in succession. After the contacts 21 have been opened and the contacts 22 closed by the arm 29 the contacts remain in these positions until they have been reset by hand.

The lock-out relays 19 are similar to the overload relay 11 except that they do not operate until the overload on the correspond load circuit exceeds a greater value than that required to operate the corresponding overload relay. They are also constructed in any well known manner so that they are locked in their operated position and have to be reset manually. Each relay is provided with a set of contacts 32 which are closed when the relay is in its normal position and a set of contacts 33 which are closed when the relay is in its operated position.

The circuit of the reclosing relay 14 extends from one side of the control circuit 10 through the contacts 32 of the lockout relays 19 in series, coil of the reclosing relay 14, coil of the notching relay 18, contacts 21 of the notching relay 18, auxiliary contacts 34 of any circuit breaker which is open, contacts of the control switch 38 associated with the open breaker to the other side of the control circuit 10. Relays 14 and 18 are, therefore, energized whenever any one of the circuit breakers opens in response to an overload which is not severe enough to operate the lockout relay in the load circuit on which the overload occurs. If the overload on any load circuit is severe enough to operate the lock-out relay 19 the opening of the contacts 32 of the lock-out relay prevents the relays 14 and 18 from being energized and the closing of contacts 33 of the lock-out relay completes the circuit of the relays 40', 41', and 42 which are connected in series and which are associated with the load circuits 1, 2 and 3, respectively. The relays 40', 41' and 42 are arranged when energized to complete the circuits of the trip coils 7' of the circuit breakers 5, 6 and 7, respectively, so that all of the load circuits are disconnected from the source 4. Since the lock-out relays are held mechanically in their operated position, the circuit of the reclosing relay 14 remains open and therefore all of the circuit breakers remain open until the operated lock-out relay 19 is reset by hand.

When the notching relay 18 has been energized a sufficient number of times to open its contacts 21 and close its contacts 22 it also completes a circuit for the coils of the relays 40', 41' and 42 so that all of the trip coils 7' are energized. Since the opening of the contacts 21 of the notching relay 18 interrupts the circuit of the coil of the reclosing relay 14, the circuit breakers cannot be reclosed automatically until the contacts of the notching relay have been reset by hand.

Control switches 36, 37 and 38 are provided for each circuit breaker so that the circuit breaker may be opened and closed independently of the load condition and without operating the reclosing relay 14 and the notching relay 18. Switch 36 is arranged to connect the trip coil 7' of the corresponding circuit breaker across the control circuit 10 when the circuit breaker is closed. Switch 37 is arranged to connect the closing coil 8 of the corresponding relay directly across the control circuit 10. Control switch 38 is arranged to open the circuit through the closing coil 8 and also the circuit arranged to be completed by the reclosing relay 14 so that the operation of the reclosing relay 14 does not close the corresponding circuit breaker. The control switch 38 is also arranged to open the circuit through the contacts 34 of the corresponding circuit breaker so that the coils of the relays 14 and 18 are not energized to automatically reclose the circuit breaker when the circuit breaker opens.

The operation of the system shown in the drawing is as follows: Let it be assumed that the load conditions on all of the single phase load circuits are normal; that the circuit breakers 5, 6 and 7 are closed, and that all of the control switches 38 are closed and all of the control switches 36 and 37 are open. Under these conditions the coils of the overload relay 11 and the lock-out relays 19 are not sufficiently energized to operate any of these relays. Consequently, the contacts 12 of all of the overload relays and the contacts 33 of all of the lock-out relays are open and the contacts 32 of all of the lock-out relays are closed. Contacts 41 of all of the circuit breakers are also open so that the coils of the reclosing relay 14 and the notching relay 18 are deenergized.

When an overload occurs on one of the load circuits, the overload relay 11, which is connected in this load circuit, operates and closes its contacts 12. If the overload is severe enough the lock-out relay 19 in the same load circuit also operates and closes its contacts 33.

Let it be assumed that an overload occurs on the load circuit 1 which causes the overload relay 11 to operate but is not severe enough to cause the lock-out relay 19 to operate. The closing of the overload contacts 12 completes a circuit for the trip coil 7' of the circuit breaker 5. This circuit extends from one side of the control circuit 10 through the auxiliary contacts 40 on the circuit breaker 5, trip coil 7' of the circuit breaker 5, contacts 12 of the operated overload relay 11 to the other side of the control circuit 10. The trip coils 7' of the other circuit breakers are not energized at this time because the corresponding overload relays are not energized. The circuit breaker 5 then opens and closes its auxiliary contacts 34 and 41. The closing of the auxiliary contacts 34 completes a circuit for the reclosing relay 14 and the notching relay 18. This circuit is as follows: From one side of the control circuit 10 through contacts 32 of all of the lock-out relays 19 in series, coil of the reclosing relay 14, coil of the notching relay 18, contacts 21 of the notching relay 19, auxiliary contacts 34 of the circuit breaker 5, which is open, contacts of the control switch 38, which is associated with the circuit breaker 5, to the other side of the control circuit. Notching relay 18 moves the ratchet 24 the distance of one tooth and moves upward the movable element of the time delay device 26. The spring 28 then moves the holding pawl 27 into engagement with the ratchet 24 so that it is held in its actuated position when the winding of the notching relay is deenergized. After the expiration of a predetermined time, which is determined by the setting of the dash-pot 15, the reclosing relay 14 closes its contacts 16 and completes a circuit for the closing coil 8 of the circuit breaker 5. This circuit is as follows: From one side of the control circuit 10 through the closing coil 8 of the open circuit breaker 5, auxiliary contacts 41 of the open circuit breaker 5, contacts of the control switch 38, contacts 16 of the reclosing relay 14, auxiliary contacts 34 of the open circuit breaker 5, contacts of the control switch 38 to the other side of the control circuit 10. The operating coils 8 of the circuit breakers 6 and 7 are not energized at this time because the auxiliary contacts 34 and 41 on these circuit breakers are opened.

The energization of the closing coil 8 of the circuit breaker 5 closes the circuit breaker and if the overload has disappeared the circuit breaker will remain in its closed position. The closing of the circuit breaker opens its auxiliary contacts 34 and 41 so that the circuit through the coils of the reclosing relay 14 and the notching relay 18 is opened. The reclosing relay 14 then returns to its normal position and no further action takes place. After a time interval determined by the setting of the device 26, the holding pawl 27, of the notching relay 18, is moved out of engagement with the ratchet 24 by the movable element of the dashpot 26 and the arm 29 is restored to its normal position by the spring 25.

If the overload is still on the load circuit 1 when the circuit breaker 5 is reclosed the overload relay 11 which is connected in this load circuit operates again and the above cycle is repeated, except that the notching relay 18 is moved the distance of another tooth. If the overload has disappeared before the circuit breaker 5 is reclosed the second time, the circuit breaker remains in its closed position, the relays 14 and 18 return to their normal positions and no further action takes place.

If the overload still exists on the load circuit 1 when the circuit breaker 5 is reclosed the second time, the overload relay 11 operates again and when the circuit breaker 5 opens and completes the above traced circuit for the reclosing relay 14 and the notching relay 18 the notching relay opens its contacts 21 and closes its contacts 22 before the slow-acting reclosing relay 14 can close its contacts 16. The opening of the contacts 21 deenergizes the coil of the reclosing relay 14 so that the automatic operation for reclosing the circuit breaker is rendered inoperative. The closing of the contacts 22 completes a circuit for the relays 40', 41' and 42. The circuit is as follows: from one side of the control circuit 10 through the coils of the relays 42, 41' and 40' in series, contacts 22 of the notching relay 18, auxiliary contacts 34 of the circuit breaker 5, contacts of the control switch 38 to the other side of the control circuit 10. Relays 41' and 42 then complete the circuits of the trip coils 7' of the circuit breakers 6 and 7, respectively. The relay 40' does not complete the circuit of the trip coil 7' of the circuit breaker 5 at this time because the circuit breaker is already open and therefore the circuit of the trip coil is open at the contacts 40. Circuit breakers 6 and 7 then open so that all of the single phase load circuits are disconnected from the polyphase source 4. In this way unbalanced operation of the polyphase system is prevented in case any single phase load circuit is permanently disconnected from the polyphase source, due to a permanent overload being connected thereto.

Since the contacts of the notching relay 18 have to be reset by hand no further automatic operation can take place until these contacts are reset. When the contacts of the notching relay 18 are reset the circuit through the coil of the reclosing relay 14 and the coil 23 of the notching relay 18 is completed through the contacts 21 of the notching relay. As soon as the reclosing relay 14 recloses its contacts 16, the circuits of the closing coil 8 of all of the circuit breakers are closed since all of the breakers are open. The circuit breakers 5, 6 and 7 then close and no further automatic operation occurs until another overload is connected to one of the single phase load circuits.

If the overload on any one of the single phase load circuits is above a predetermined value, for example, the interrupting capacity of the circuit breaker in the corresponding load circuit, it is very desirable not to reclose the circuit breaker automatically under such conditions. The lock-out relays 19 are therefore provided and are arranged so that they complete the circuits of the relays 40', 41' and 42 whenever the load on any single phase load circuit exceeds a predetermined value. Let it be assumed that an overload occurs on the load circuit 1 which is severe enough to operate the lock-out relay 19 in this particular load circuit. The overload relay 11 in this circuit also operates and, by closing its contacts 12, energizes the trip coil 7' to open the breaker 5. The lock-out relay 19 opens its contacts 32 and closes its contacts 33. The opening of the contacts 32 deenergizes the relays 14 and 18 so that further automatic reclosing of the circuit breakers is prevented. The closing of the contacts 33 of the lock-out relays 19 completes a circuit for the relays 40', 41' and 42. This circuit is as follows: from one side of the control circuit 10 through the coils of the relays 42, 41' and 40' in series contacts 33 of the lock-out relay 19 in the load circuit 1 to the other side of the control circuit 10. Relays 41' and 42 then operate to complete the circuits of the trip coils 7' of the circuit breakers 6 and 7. Since the lock-out relays 19 are hand reset, all of the circuit breakers remain open until the lock-out relay 19 in the overloaded load circuit is restored to its normal position by hand.

The opening of any one of the control switches 38 removes the corresponding circuit breaker from the control of the reclosing relay 14, since it prevents the circuit of the relays 14 and 18 from being completed through the auxiliary contacts 34 of the corresponding circuit breaker when it is opened and prevents the closing coil 8 from being energized when the relay 14 closes its contacts 16 due to the opening of one of the other circuit breakers. When the switch 38 is opened the corresponding breaker may be controlled by the control switches 36 and 37 which are arranged to complete the circuits for the trip coil 7' and the closing coil 8, respectively, of the corresponding circuit breaker.

While I have shown and described one embodiment of my invention, I do not desire to be limited to this particular arrangement but seek to cover in the appended claims all those modifications which fall within the true spirit and scope of my invention.

What I claim as new and desire to secure by Letters Patent of the United States, is,—

1. In combination, a source of current, a plurality of load circuits, a circuit breaker associated with each load circuit and arranged to connect the load circuit to said source of current, means operative to effect the opening of a circuit breaker when the current in the load circuit controlled thereby exceeds a predetermined value, means operative to close automatically a circuit breaker after the same has been opened by said last mentioned means, and means operative to effect the opening of all of said circuit breakers and to render said reclosing means inoperative when the current in a load circuit exceeds a second predetermined value.

2. In combination, a source of current, a plurality of load circuits, a circuit breaker associated with each load circuit and arranged to connect the load circuit to said source of current, means operative to effect the opening of a circuit breaker when the current in the load circuit controlled thereby exceeds a predetermined value, means operative to close automatically a circuit breaker after the same has been opened by said last mentioned means, and means operative to effect the opening of all of said circuit breakers and to render said reclosing means inoperative when a circuit breaker has been opened by said first mentioned means a predetermined number of times.

3. In combination, a source of current, a plurality of load circuits, a circuit breaker associated with each load circuit and arranged to connect the load circuit to said source of current, means operative to effect the opening of a circuit breaker when the current in the load circuit controlled thereby exceeds a predetermined value, means operative to close automatically a circuit breaker after the same has been opened by said last mentioned means, and means operative to effect the opening of all of said circuit breakers and to render said reclosing means inoperative when a circuit breaker has been opened successively by said first-mentioned means a predetermined number of times with less than a predetermined time between each successive reclosure.

4. In combination, a source of current, a plurality of load circuits, a circuit breaker associated with each load circuit and arranged to connect the load circuit to said source of current, means operative to effect the opening of a circuit breaker when the current in the load circuit controlled thereby exceeds a predetermined value, means operative to close automatically a circuit breaker after the same has been opened by said last mentioned means, and means operative to effect the opening of all of said circuit breakers and to render said reclosing means inoperative when the current in a load circuit exceeds the interrupting capacity of the circuit breaker in the load circuit.

5. In combination, a source of polyphase current, a plurality of single phase load circuits, a circuit breaker associated with each single phase load circuit and arranged to connect the load circuit to said source, means operative to effect the opening of a circuit breaker when the current in the single phase load circuit controlled thereby exceeds a predetermined value, means operative to close a circuit breaker automatically after the same has been opened by said last mentioned means, and means operative to effect the opening of all of said circuit breakers and to render said reclosing means inoperative when the current in any one of the single phase load circuits exceeds a second predetermined value.

6. In combination, a source of polyphase current, a plurality of single phase load circuits, a circuit breaker associated with each single phase load circuit and arranged to connect the load circuit to said source, means operative to effect the opening of a circuit breaker when the current in the single phase load circuit controlled thereby exceeds a predetermined value, means operative to close a circuit breaker automatically after the same has been opened by said last mentioned means, and means operative to effect the opening of all of said circuit breakers and to render said reclosing means inoperative when a circuit breaker has been opened by said first mentioned means a predetermined number of times.

7. In combination, a source of current, a plurality of load circuits, a circuit breaker associated with each load circuit and arranged to connect the load circuit to said source of current, means operative to effect the opening of a circuit breaker when the current in the load circuit controlled thereby exceeds a predetermined value, a closing coil for each circuit breaker, a reclosing relay, a notching relay, circuit connections for said reclosing relay and notching relay arranged to be completed to operate said relays when any one of the circuit breakers opens, and a circuit for each closing coil controlled by said reclosing relay, said notching relay and the position of the circuit breaker which the closing coil controls.

8. In combination, a source of current, a plurality of load circuits, a circuit breaker associated with each load circuit and arranged to connect the load circuit to said source of current, means operative to effect the opening of a circuit breaker when the current in the load circuit controlled thereby exceeds a predetermined value, a closing coil for each circuit breaker, a reclosing relay, a notching relay, circuit connections for said reclosing relay and notching relay arranged to be completed to operate said relays when any one of the circuit breakers opens, and a circuit for each closing coil arranged to be completed when the circuit breaker controlled by the closing coil is open, said reclosing relay is in its operated position and said notching relay has not been energized a predetermined number of times.

9. In combination, a source of current, a plurality of load circuits, a circuit breaker associated with each load circuit and arranged to connect the load circuit to said source of current, means operative to effect the opening of a circuit breaker when the current in the load circuit controlled thereby exceeds a predetermined value, a closing coil for each circuit breaker, a reclosing relay, a notching relay, circuit connections for said reclosing relay and notching relay arranged to be completed to operate said relays when any one of the circuit breakers opens, a circuit for each closing coil controlled by said reclosing relay, said notching relay and the position of the circuit breaker which the closing coil controls, and means operative to effect the opening of the circuit breakers in all of the other load circuits when the current in any one of said load circuits exceeds a second predetermined value and to interrupt the circuit connections of said reclosing relay and said notching relay.

10. In combination, a source of current, a plurality of load circuits, a circuit breaker associated with each load circuit and arranged to connect the load circuit to said source of current, a trip coil and a closing coil for each circuit breaker, a circuit for each trip coil, an overload relay in each load circuit arranged to effect the completion of the circuit of the trip coil of the circuit breaker in the corresponding load circuit when the load current therein exceeds a predetermined value, a slow acting reclosing relay, a notching relay, circuits for said reclosing relay and said notching relay arranged to be completed by the opening of any one of said circuit breakers, a circuit for each closing coil arranged to be completed in response to the operation of said reclosing relay when the corresponding circuit breaker is open, and hand reset contacts arranged to be actuated by said notching relay when energized a predetermined number of times to effect the completion of the trip coils of the circuit breakers that are not open and to open the circuit of said reclosing relay.

11. In combination, a source of current, a plurality of load circuits, a circuit breaker, associated with each load circuit and arranged to connect the load circuit to said source of current, a trip coil and a closing coil for each circuit breaker, a circuit for each trip coil, an overload relay in each load circuit arranged to effect the completion of the circuit of the trip coil of the circuit breaker in the corresponding load circuit when the load current therein exceeds a predetermined value, a slow acting reclosing relay, a notching relay, circuits for said reclosing relay and said notching relay arranged to be completed by the opening of any one of said circuit breakers, a circuit for each closing coil arranged to be completed in response to the operation of said reclosing relay when the corresponding circuit breaker is open, hand reset contacts arranged to be actuated by said notching relay to effect the completion of the trip coils of the circuit breakers that are not open and to open the circuit of said reclosing relay, and a lock-out relay connected to each load circuit arranged to effect the completion of the trip coils of all of the circuit breakers which are closed and to open the circuit of said reclosing relay when the load current in the load circuit exceeds a second predetermined value.

12. In combination, a source of current, a plurality of load circuits, a circuit breaker associated with each load circuit and arranged to connect the load circuit to said source of current, a trip coil and a closing coil for each circuit breaker, an overload relay in each load circuit arranged to be operated when the load current exceeds a predetermined value, a lock-out relay in each load circuit arranged to be operated when the load current exceeds a predetermined value, a slow-acting reclosing relay, a notching relay, a circuit for each trip coil arranged to be completed when the overload relay in the corresponding load circuit operates and when the corresponding circuit breaker is closed and any one of the lock-out relays in any of the other load circuits operates, a circuit for said notching relay and said reclosing relay arranged to be completed when any one of said circuit breakers is open, contacts in said last mentioned circuit controlled by said notching relay and lock-out relays so that said reclosing relay is rendered inoperative after said notching relay has been energized a predetermined number of times or any one of the lock-out relays has been operated, and a circuit for each closing coil arranged to be completed by operation of said reclosing relay when the corresponding circuit breaker is open.

13. In combination, an electric circuit, a circuit breaker in said electric circuit, current responsive means for effecting the opening of said circuit breaker when the current in said electric circuit exceeds a predetermined value, reclosing means for automatically reclosing said circuit breaker when it is opened by the operation of said current responsive means, and current responsive means for rendering said reclosing means inoperative when the current in said electric circuit exceeds a second predetermined value.

14. In combination, an electric circuit, a circuit breaker in said electric circuit, means for effecting the opening of said circuit breaker when a predetermined overload occurs on said electric circuit, automatic reclosing means for reclosing said circuit breaker a predetermined number of times when the overload which causes said circuit breaker to open remains connected to said electric circuit, and means operative in response to a greater predetermined overload on said electric circuit for rendering said reclosing means inoperative to close said circuit breaker a predetermined number of times.

15. In combination, an electric circuit, a circuit breaker in said electric circuit, means for effecting the opening of said circuit breaker when the current in said electric circuit exceeds a predetermined value, closing means for said circuit breaker, control means operative in response to the opening of said circuit breaker to effect the operation of said closing means after said circuit breaker has been open a predetermined length of time, and means for rendering said control means inoperative to effect the operation of said closing means when the current in said electric circuit exceeds a predetermined value.

16. In combination, an electric circuit, a circuit breaker in said electric circuit, means for effecting the opening of said circuit breaker when the current in said electric circuit exceeds a predetermined value, closing means for said circuit breaker, a time delay relay adapted to be energized to effect the operation of said closing means to close said circuit breaker when said circuit breaker is opened, and means for rendering said time delay relay inoperative to effect the operation of said closing means when the current in said electric circuit exceeds a second predetermined value.

17. In combination, an electric circuit, a circuit breaker in said electric circuit, means for effecting the opening of said circuit breaker when the current in said electric circuit exceeds a predetermined value, closing means for said circuit breaker, a time delay relay adapted when energized to effect the operation of said closing means, a circuit for said relay arranged to be completed in response to the opening of said circuit breaker, and a lock-out relay operative in response to a predetermined current in said electric circuit to open the circuit of said time delay relay, whereby said relay is rendered inoperative to effect the reclosing of said circuit breaker.

In witness whereof I have hereunto set my hand this 8th day of May, 1922.

BENJAMIN S. WEINFIELD.